Patented Feb. 27, 1934

1,949,231

UNITED STATES PATENT OFFICE 1,949,231

PROCESS FOR OBTAINING HIGH YIELDS OF HIGH GRADE LUBRICANTS FROM PETROLEUM OIL

Philip L. Young, New York, N. Y., assignor to Standard-I. G. Company

No Drawing. Application July 19, 1930
Serial No. 469,258

5 Claims. (Cl. 196—13)

The present invention relates to the art of producing valuable lubricating oils from unrefined hydrocarbon oils by means of an improved combination process involving the use of two stages, in the first of which a selective solvent for certain hydrocarbon products is employed, while in the second a treatment with hydrogen under high temperature and pressure is applied to the extracted fraction. My invention will be fully understood from the following description.

In a prior application Serial No. 379,086 to Edgar M. Clark and in Serial No. 385,762 to James M. Jennings, processes are disclosed for the treatment of heavy petroleum oils with hydrogen under high pressure and at high temperature to produce valuable lubricating oils. When heavy hydrocarbon oils are hydrogenated in this way, a considerable part of the oil is reduced in boiling point to a degree to render it unsuitable for use as lubricant. This lower boiling oil may consist of a mixture of gasoline, kerosene, gas oil and the like, and may amount to about 15 to 50 percent of the feed oil, depending on the severity of the hydrogen treatment. A more intensive treatment produces a larger percentage of lower boiling oils, as will be understood.

It has already been proposed to treat heavy hydrocarbons with selective solvents such as phenol in order to produce high grade lubricating oils. By this process a yield of 50 to 85 percent of lubricating oil is obtained, while the remainder of the feed consists of oil of little value as a lubricant. In distinction to the hydrogenation treatment, however, these non-lubricating fractions are practically of the same density as the feed, since little or no formation or separation of lower boiling oil takes place during the extraction.

I propose therefore to treat the unrefined hydrocarbon oil by solvent extraction to produce high quality lubricating oil and fractions unsuitable for lubricants, all or part of which latter fractions are then subjected to high pressure hydrogen treatment to convert them into high quality lubricants.

In the practice of my invention the feed stock may comprise reduced crudes, finished or unfinished lubricating stocks, which may be of any density suitable for lubricating purposes. The solvent which I prefer to use comprises phenol, although it will be understood that I may use such materials as sulfur dioxide and the like. In the following description, however, I shall describe my method using phenol as the illustration, since it is my preferred solvent. The phenol may be used in the anhydrous condition, or it may contain 5 to 15 percent water, or if desired any suitable phenol liquefying material such as glycerine, ethylene glycol, and the like may be used in mixture with the phenol.

The extraction may be carried out either as a batch operation, or semi-continuously or continuously in any appropriate apparatus. For example, in batch operation the phenol and oil are agitated in a vessel for a certain length of time, say one half hour, after which they are allowed to settle for a period of the same length of time. The time of agitating and settling depends on the treating temperature and the viscosity of the oil to be treated, lower temperatures and higher viscosities requiring a longer time. The amount of treating agent used may vary from 50 to 300 percent. In many cases a proportion of 100 pounds of phenol to 100 pounds of oil in a counter-current continuous treater is found to be advantageous.

Selection of the proper temperatures for the treatment is important. This should be kept at all times above the melting point of the solvent, which is 106° F. in the case of anhydrous phenol, but should not exceed a certain critical temperature at which the phenol becomes completely miscible with the oil. This latter temperature cannot be stated definitely, since it varies with the oil to be treated, but is usually below 250° F. and has a great influence on raffinate yield and improvement obtained. The optimum temperature of treating most oils with about 100 to 150 percent of phenol is between about 125 and 150° F. Higher treating temperatures cause a greater improvement in lubricating quality, sulfur elimination, etc. but at the same time reduce the yield of raffinate.

After treatment the material is allowed to settle whereby two layers are formed, the lower layer comprising the bulk of the solvent and the extracted material. The treated oil usually contains 5 to 20 percent of phenol which can be separated from the oil by distillation. Similarly, the phenol may be removed from the mixture of phenol and extracted constituent by distilling off the phenol from this extract. Both oil fractions may preferably be further purified of the last traces of phenol by means of a hot lye wash. It will be understood that the recovered phenol may be returned to the process for reuse as solvent.

The substantially phenol-free material extracted from the oil by the solvent treatment is now conducted to the high pressure hydrogenation stage. All the extracted oil may be sent to the hydrogenation stage, or fractions thereof may be employed. For example if a number of batch treatments with solvent are used, the extracted oil from one or more treatments may be hydrogenated either separately, or after suitably blending two or more extracts.

In the hydrogenation step the oil is subjected to a hydrolubriforming treatment in any suitable type of apparatus well known in the art. By hydrolubriforming is meant the treatment of lubricating stocks in order to convert them to high grade lubricants by reforming them in the presence of hydrogen so as to improve their temperature-viscosity characteristics, and at the same time improving color, reducing sulfur and Conradson carbon. The temperature is in general below about 850° F. and preferably in the range between about 700 and 800° F. Pressure is in excess of 50 atmospheres, and ordinarily may be 100, 200 or even 1000 atmospheres, or more, if desired. An excess of gas rich in hydrogen is passed through the reaction zone with the oil, usually in a volume equivalent to 5000 to 10,000 cubic feet per barrel of oil fed. The feed rate is ordinarily between about 0.3 and 1.5 volumes of oil per volume of reaction zone per hour. Catalysts may be employed in the reaction zone in the form of lumps packed into the reaction chamber, or the catalyst may be supported upon suitable surfaces or carriers. Materials such as the oxides and/or sulfides of molybdenum, chromium, and tungsten, either alone, or in combination with other compounds such as zinc oxide, magnesia and the like, may be employed as catalysts.

The oil recovered from the hydrolubriforming hydrogenation is cooled, preferably washed with alkali, and then distilled to remove low boiling oils formed in the process and to reduce the oil to the desired viscosity. The lubricating oil obtained from the hydrogenation step may be employed separately, but is preferably blended either totally or in any proportion with the high grade lubricating oil produced in the solvent extraction stage.

By use of my combination process greater yields of high grade lubricants may be obtained from the feed oil than by use of either solvent extraction or hydrolubriforming hydrogenation alone. Hydrogenation to produce lubricants of high quality results in about the same yield, namely 40 to 85 percent, of the same quality oil as when solvent extraction is employed. In the case of hydrogenation, the material unsuitable for lubricants consists of oils of too low a boiling point while in extraction the unsuitable 15 to 60 percent is represented by hydrocarbons deficient in hydrogen and generally unsuitable for lubricating purposes, but showing no decrease in viscosity at 210° F. over that of the feed. The hydrolubriforming treatment of these undesirable fractions, yields, therefore, a total percentage of lubricants on the original feed hitherto unobtainable. For example, by operation of my combination process I may secure from 5 to 25 percent more high quality oil from the feed stock than by either solvent extraction or hydrolubriforming alone.

The lubricating oils obtained by my process are characterized by high flash, excellent color and low sulfur. The color is often in excess of 5 or 10 Robinson and the sulfur is generally below 0.25 or even 0.08 percent. The Conradson carbon is satisfactory. My oils are especially superior from the standpoint of viscosity-temperature relationship, often being equal or superior to Pennsylvania oils in this respect. For example, oils of poor viscosity-temperature relationship, such as Coastal and Columbia oils may be rendered equal or better than natural oils derived from Pennsylvania or equivalent crudes. The following table shows inspections of oils which may be produced by my process:

| | | |
|---|---|---|
| Gravity—°A.P.I. | 29.1 | 27.3 |
| Saybolt viscosity @ 210 °F. | 52 sec. | 75 sec. |
| Saybolt viscosity @ 100 °F. | 287 sec. | 672 sec. |
| Flash—°F. | | 480 |
| Conradson carbon—% | 0.13 | 0.43 |
| Sulphur—% | 0.31 | |

As an example of my process an oil of the following characteristics is selected as the feed stock:

| | |
|---|---|
| Gravity—°A. P. I. | 22.8° |
| Saybolt viscosity @ 100° F. | 880 sec. |
| Saybolt viscosity @ 210° F. | 75 sec. |
| Viscosity index | 72 |
| Flash | 420° F. |
| Conradson carbon | 1.38% |

The term "Viscosity index" is a function of the viscosity at 100° and 210° F. and indicates the quality of the oil from the standpoint of temperature-viscosity relationship by the magnitude of the index number. For example lubricating oils of the Pennsylvania class, which are characterized by their high quality, have a viscosity index from 90 to 100, while low grade oils such as Texas Coastal fall in the range between 10 and 30. A complete description of this method of classifying lubricating oils may be found in an article by E. W. Dean and G. H. B. Davis in "Chemical and Metallurgical Engineering", volume 36, page 618. When the feed oil is extracted with phenol by means of three treats with 100 percent anhydrous phenol at 150° F., the following extract and raffinate are obtained:

| | Raffinate | Extract |
|---|---|---|
| Yield on 100 gal. of feed | 70 gal. | 30 gal. |
| Gravity—A.P.I. | 26.0° | 18.1° |
| Saybolt viscosity @ 100° F. | 662 sec. | 1,325 sec. |
| Saybolt viscosity @ 210° F. | 70 sec. | 78 sec. |
| Viscosity index | 90 | 26 |
| Flash | 440° F. | 410° F. |
| Conradson carbon | 1.25% | 2.03% |

The same feed stock is then passed through a reactor packed with a lump catalyst composed of the oxides of magnesium, molybdenum, and zinc and maintained at 765° F. and 200 atmospheres pressure. Hydrogen is passed through in excess in an amount equivalent to 6800 cubic feet per barrel of oil and the rate of oil flow in held at 0.6 volumes of oil per volume of reactor space per hour. A yield of 69% of lubricating oil approximately the following characteristics is obtained:

| | | |
|---|---|---|
| Yield on 100 gal. of feed | 69 gal. | 33 gal. gasoline and gas oil |
| Gravity—A.P.I. | 25.6° | |
| Saybolt—viscosity @ 100° F. | 680 sec. | |
| Saybolt—viscosity @ 210° F. | 71 sec. | |
| Viscosity index | 90 | |
| Flash | 450° F. | |
| Conradson carbon | 0.39% | |

From this it may be seen that approximately the same yield of the same quality oil is obtained by hydrolubriforming hydrogenation as by phenol extraction of the original feed oil.

The extract obtained from the phenol treatment is then hydrolubriformed at 200 atmospheres pressure and 775° F. temperature. The catalyst consists of the oxides of magnesium, zinc, and molybdenum. Hydrogen is used in the ratio of 6800 cubic feet per barrel of oil and the feed oil rate is adjusted to 0.6 volumes of oil per volume of reactor space per hour. This treatment yields the following from the 30 gallons of extract:

|  | 70 viscosity oil | Spindle oil | Gas oil and gasoline |
|---|---|---|---|
| Yield | 11.7 gal | 8.7 gal | 10.2 gal. |
| Gravity A.P.I | 26.5° | 26.2° | |
| Saybolt viscosity @ 100° F | 683 sec | 114 sec | |
| Saybolt viscosity @ 210° F | 71 sec | 41 sec | |
| Viscosity index | 90 | 80 | |
| Flash | 515° F | 360° F | |
| Conradson carbon | 0.254% | | |

When the 11.7 gallons of hydrolubriformed oil of 70 viscosity at 210° F. is blended with the raffinate from the phenol extraction stage a total yield based on the original feed of 81.7 percent of oil of the following characteristics is obtained:

| | |
|---|---|
| Yield on 100 gal. of feed | 81.7 gal. |
| Gravity—A. P. I | 26.1 gal. |
| Saybolt viscosity @ 100° F | 670 sec. |
| Saybolt viscosity @ 210° F | 70 sec. |
| Viscosity index | 90 |
| Flash | 450° F. |
| Conradson carbon | 1.12% |

This indicates that almost 12 percent more lubricating oil of 70 viscosity at 210° F. was obtained by use of my combination process than by either hydrogenation or phenol extraction alone. In addition to this my process produced about 9 percent of valuable spindle oil.

This invention is not to be limited by any theory of the mechanism of the reaction nor to any specific example which may have been given for purpose of illustration, but only by the following claims in which I wish to claim all novelty inherent in my invention.

I claim:

1. An improved process for producing increased yields of valuable lubricating oils from unrefined viscous petroleum fractions, which comprises extracting the oil with a selective solvent thereby separating the oil into liquid portions of high and low lubricating value, and subjecting a fraction of the latter to destructive hydrogenation with hydrogen under superatmospheric pressure in excess of 50 atmospheres and at elevated temperature between 700 and 850° F. for conversion into oil of high lubricating value.

2. Process according to claim 1, in which the selective solvent comprises phenol.

3. Process according to claim 1, in which the selective solvent comprises a mixture of phenol and a liquefying agent.

4. An improved process for producing increased yields of valuable lubricating oils from unrefined viscous petroleum fractions, which comprises extracting the oil with a selective solvent thereby separating the oil into liquid portions of high and low lubricating value, subjecting fractions of the latter to hydrolubriforming treatment for conversion to oil of high lubricating value, and incorporating suitable portions of the hydrogenated with portions of the unhydrogenated fractions.

5. Process of improving the quality of a lubricating oil fraction derived from petroleum, including reduction in the change of viscosity with temperature, which comprises extracting the fraction with a selective solvent thereby separating the fraction into liquid fractions of high and low lubricating value, subjecting the latter to hydrolubriforming treatment whereby its viscosity-temperature change is diminished, and suitably blending portions of the hydrolubriformed with the unhydrogenated oil.

PHILIP L. YOUNG.